March 3, 1964      T. R. BROMWELL      3,123,385

MERCHANDISE INVENTORY CONTROL MEANS

Filed June 21, 1961      2 Sheets-Sheet 1

INVENTOR
THEODORE R. BROMWELL
ATTORNEY

March 3, 1964     T. R. BROMWELL     3,123,385
MERCHANDISE INVENTORY CONTROL MEANS
Filed June 21, 1961     2 Sheets-Sheet 2
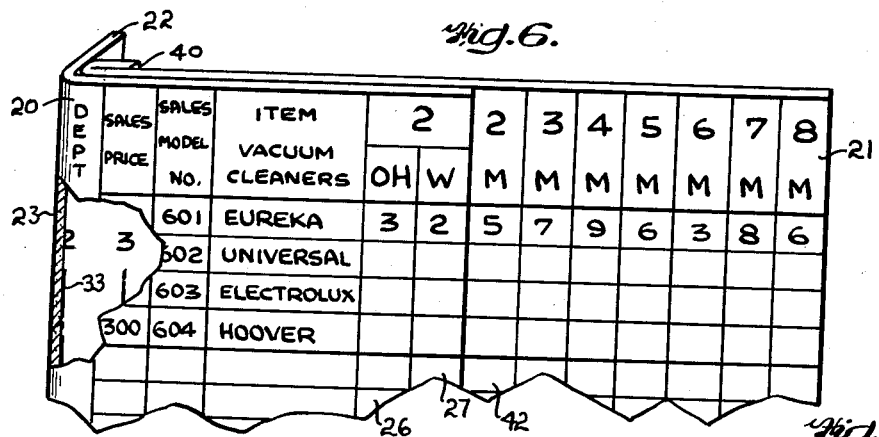
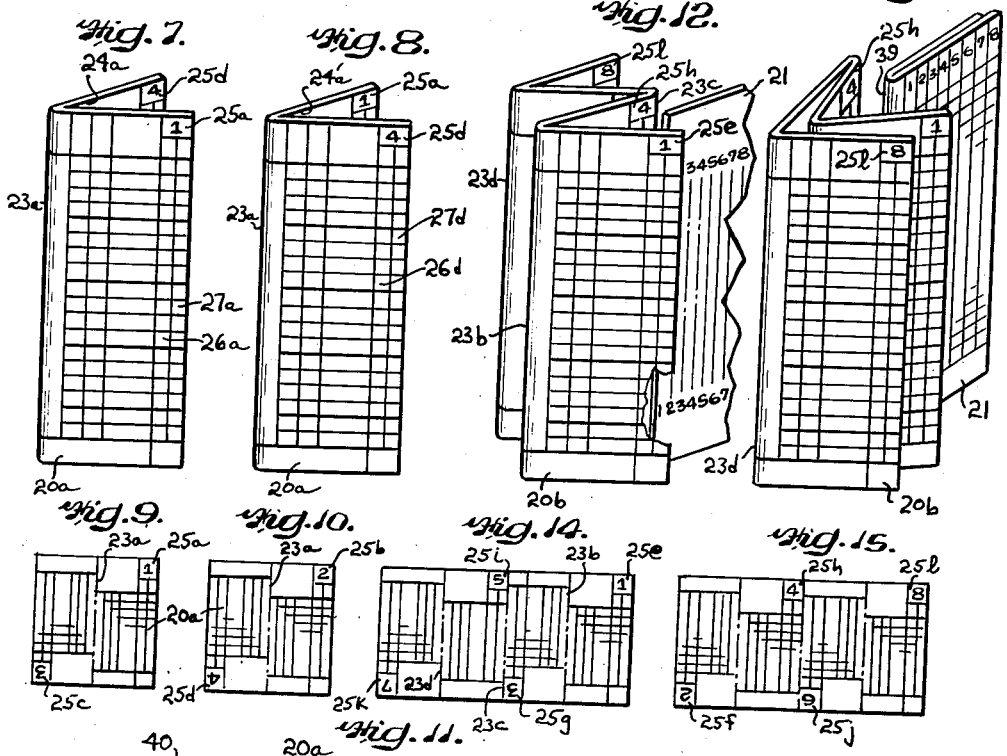
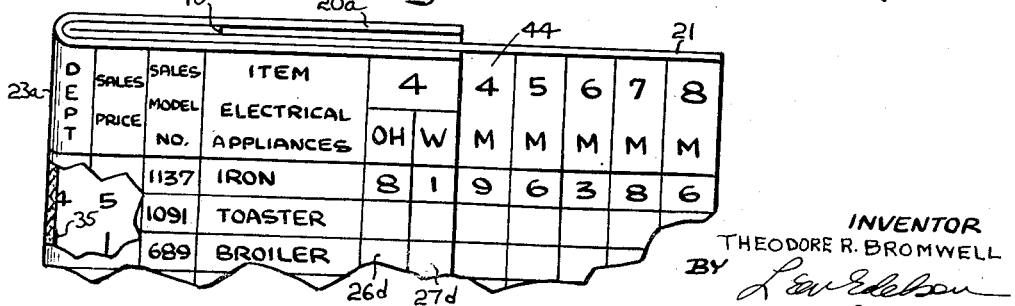
INVENTOR
THEODORE R. BROMWELL
BY
ATTORNEY

United States Patent Office 3,123,385
Patented Mar. 3, 1964

3,123,385
MERCHANDISE INVENTORY CONTROL MEANS
Theodore R. Bromwell, Philadelphia, Pa.
(464 Hoodridge Drive, Pittsburgh 34, Pa.)
Filed June 21, 1961, Ser. No. 118,560
3 Claims. (Cl. 283—55)

This invention relates generally to merchandise inventory control means, and more particularly relates to a two-part inventory control device by means of which sales personnel may rapidly check their inventory on hand of particular stocked items and quickly determine whether or not their inventory is at a satisfactory level, and if it is not, give an indication of the exact quantity of the particular item which should be ordered to bring the inventory to the desired level.

One part of the two-part control device is a stock list sheet having printed at one side marginal edge control entry columns in which notations may be entered in accordance with information obtained from the other part of the two-part device, and also being provided at its opposite side marginal edge with keying or indexing means by which the second part of the two-part device may be properly physically indexed relative to the first part to bring appropriate data adjacent to the control column on the first part as previously mentioned. The second part of the two-part device is a control sheet upon which is appropriately entered the control information for a plurality of stock lists and includes indexing means corresponding to different stock lists which co-operate with the indexing means of each stock list to properly index the control sheet to selected ones of the stock lists. Accordingly, it is a primary object of this invention to provide a novel merchandise inventory control device by means of which a rapid determination may be made of whether or not the inventory of stocked items is at a satisfactory level, and if not, precisely what quantities must be ordered to bring the inventory to its desired point.

Another object of this invention is to provide a novel merchandise inventory control device consisting of two-parts each having indexing means conjointly operative to properly intermesh the two-parts of the device and thereby index one of the parts relative to the other of the parts to thereby permit inventory evaluation as aforesaid.

The foregoing and other objects of this invention will become clear from a reading of the following specification in conjunction with an examination of the appended drawings, wherein:

FIGURE 1 illustrates the two parts of the inventory control device, the part on the left being an itemized stock list and the part on the right being an inventory control sheet containing data and usable with a plurality of different stock lists;

FIGURE 2 illustrates the two parts of the control device indexed relative to one another to bring particular data on the control sheet into a predetermined physical position relative to the stock list;

FIGURE 3 is an enlarged plan view of the stock list illustrated at the left in FIGURE 1;

FIGURE 4 illustrates the same stock list as that illustrated in FIGURE 1 but turned top-for-bottom and reversed to show a similar stock list appearing on the reverse side;

FIGURE 5 illustrates the control sheet also illustrated in FIGURE 1 but with the left-hand marginal edge folded back along a particular indexing line so that the control sheet may be properly indexed to the stock list shown in FIGURE 4;

FIGURE 6 illustrates in enlarged fragmentary view the stock list of FIGURE 4 and the control sheet of FIGURE 5 intermeshed with one another to provide the same function as that illustrated in FIGURE 2, excepting that a different portion of the indexing system is employed;

FIGURE 7 illustrates a somewhat different form of stock list from that shown in FIGURES 1 and 4 in that this form provides space for four separate stock lists instead of two;

FIGURE 8 illustrates the same stock list as that shown in FIGURE 7 but with the leaves reverse folded to bring list 4 to the front position instead of having disposed there the list number 1;

FIGURE 9 shows in reduced size plan view the folded stock list of FIGURE 7 opened out flat;

FIGURE 10 shows in reduced size plan view the stock list of FIGURE 8 turned left-for-right;

FIGURE 11 is an enlarged fragmentary view similar to the showing of FIGURE 6 but with the indexing system arranged to be operative for the list number 4;

FIGURE 12 illustrates a further expanded form of stock list having eight separate such lists on a single folded piece of paper;

FIGURE 13 illustrates the same stock list shown in FIGURE 12 but with the particular stock list 8 being brought around to the front and with the inventory control sheet being properly folded along its index line for use with the list number 8;

FIGURE 14 is a reduced size opened out plan view of the folded stock list illustrated in FIGURE 12; and FIGURE 15 is a reduced size flat plan view of the stock list when opened out from its position as seen in FIGURE 13.

In the several figures, like elements are denoted by like reference characters.

Examining first FIGURES 1, 2 and 3, there is seen at the left of FIGURE 1 the stock list designated generally as 20, and at the right the control sheet generally designated as 21. The left-hand marginal edge 22 of the stock list 20 is folded back along the broken line 23 to form a pocket 24. The upper right-hand corner of the stock list 20 shows a list number block 25 within which is printed the number 1 to thereby identify the list as stock list number 1. Immediately below the list number block 25 and extending downward therefrom along the right-hand marginal edge of the stock list 20 are a pair of side-by-side columns 26 and 27, the right-hand column 27 being designated as the "wanted" column by the letter W appearing immediately above in the block 29 and the left-hand column 26 being designated as the "on hand" column by the letters OH appearing immediately thereabove in the block 28. Immediately to the left of these two columns is the "item" column 30 which lists below one another the various items covered by the stock list number 1. To the left of the item column 30 other desired information relative to the particular items may be shown if desired, as for example the sales model number shown in column 31 and the sales price of the item shown in column 32. Printed on the reverse side of the stock list sheet 20 is a second list designated as list number 2 in the list number block 25', this being illustrated in FIGURE 4. The form of the stock list number 2 is exactly the same as that of the list number 1 excepting, of course, that it will contain different items. Additionally, the left marginal edge 22 of the stock list sheet 20 is reverse bent about the broken line 23 to form the open ended pocket 24'.

The left-hand side of the control sheet 21 is observed to have a plurality of vertically running dashed lines 33 through 39, each such line having associated therewith a stock list designation number disposed above and below the line, as for example the line 35 is indicated to be associated with the stock list number 4. The left-hand edge of the control sheet 21 designated as 40 is the equivalent of one of the dashed lines 33 through 39 and corresponds to such for purpose of establishing indexing with the stock list number 1. The right-hand half of the control sheet 21 is divided into a plurality of vertically extending columns 41 through 48, each of such columns including as a heading thereabove a number which corresponds to a particular stock list number and also to one of the dash lines on the left-hand side of the control sheet 21. For example, the previously mentioned dash line 35 which corresponds to the stock list number 4 is used in conjunction with the column 44 on the right-hand side of the control sheet 21, this column 44 also being designated as for use with the stock list number 4. Appearing immediately beneath the stock list designation number of each column is the letter "M" which stands for the designation "Model Stock," meaning that the numbers in each of the columns 41 through 48 designate the desired level of the inventory for each of the items appearing on particular stock lists.

FIGURE 2 illustrating the two parts of the inventory control device intermeshed with one another discloses the manner of operation of the device. When list number 1 is to be used, the left-hand edge 40 of the control sheet 21 is slid behind the stock list sheet 20 until it slides into the bottom of the pocket 24 formed by the turned back left marginal edge 22 of the stock list sheet 20. With the edge 40 of the control sheet 21 seated in the pocket 24, it is observed that column 41 of the control sheet 21 lines up immediately to the right of the "wanted" column 27 of the stock list number 1. When now the inventory of the first item on the list number 1 is checked to see what quantity of stock is on hand, the actual number on hand is entered in column 26, as for example is clearly illustrated in FIGURE 3 which shows that a quantity of three alarm clocks are actually in stock. Comparison with the desired model stock number for this alarm clock item appearing in column 41 of the control sheet 21 discloses that the desired inventory quantity should be nine alarm clocks, and, therefore, the difference between what is actually on hand and what is desired to keep on hand is entered in the "wanted" column 27, in this case the number entered being the digit six. The remainder of the items in stock list number 1 are then treated in exactly the same manner.

FIGURES 4, 5 and 6 show exactly the same procedure being carried out with respect to stock list number 2 which is printed on the reverse side of the stock list sheet which contains the stock list 1, as previously pointed out. Stock list number 2 is checked by first reversing the stock sheet 20 to cause the list number 2 to face upward and by also reverse bending the left-marginal edge 22 of the stock sheet 20 to form the pocket 24'. The control sheet 21 is then creased vertically along the dash line 33 to thereby fold back the left edge 40 of the control sheet and cause the dash line 33 to assume the position of the left-hand edge of the control sheet, this condition being illustrated in FIGURE 5. The control sheet 21 is then slid behind the stock list sheet 20 until the left-hand edge line 33 abuts the bottom of the pocket 24' in the manner clearly seen in the showing of FIGURE 6. As is also seen in FIGURE 6, the control sheet column 42 is now disposed immediately to the right of the wanted column 27 of the list number 2, and the identifying number 2 of the stock list is placed in correspondence with the number 2 at the head of column 42 on the control sheet 21. As illustrated, the list number 2 shows vacuum cleaner items and the Eureka cleaner inventory shows a supply of three on hand as compared with the desired model stock on hand amount of five, so that in the "wanted" column 27 of the stock list number 2 is entered the quantity two representing the difference between the desired quantity and those actually in stock.

From the foregoing, it should be now clear that for example when it is desired to check the stock list number 5 for example, the control sheet 21 would be folded vertically along the dashed line 36, and when so folded would be slipped behind the stock list number 5 until the line 36 now forming the left-hand edge of the control sheet 21 would be disposed immediately to the right of the column 27 of the stock list number 5. The same procedure is, of course, followed for all of the other lists.

The modification illustrated in FIGURES 7 through 15 all work in precisely the same manner as heretofore described. The sole difference between the inventory control device illustrated in FIGURES 1 through 6 on the one hand and the modified devices illustrated in FIGURES 7 through 15 on the other hand resides in the fact that whereas the stock list sheet 20 of FIGURES 1 to 6 have room for only two stock lists, the stock sheets illustrated in FIGURES 7 through 11 are provided with four lists, and those illustrated in FIGURES 12 through 15 contain eight stock lists on a single sheet. On the stock lists of FIGURES 7 through 11 the elements corresponding to the same ones shown in FIGURES 1 through 6 have been designated by small letter "a" following the same numeral, for example the "on hand" and "wanted" columns have been designated respectively as 26a and 27a, and so on for the others. The various elements of FIGURES 12 through 15 are treated in precisely the same manner and the stock list sheets 20b are again used with the control sheet 21 in the manner previously described, and as illustrated in FIGURES 12 and 13.

From the foregoing, it is observed that the eight column control sheet 21 has eight separate indexing means corresponding to the dashed fold lines 33 through 39 and the left-marginal edge 40 so that it may be properly indexed against eight separate stock lists. The stock lists themselves may take the form of a double list sheet such as the sheet 20 illustrated in FIGURES 1 through 6, or a four list sheet such as 20a illustrated in FIGURES 7 through 11, or even an eight list sheet 20b as shown in FIGURES 12 through 15. Similarly, the control sheet 21 may be extended for use with fewer or greater numbers of stock lists as desired. In all cases, however, it is required that the distance on the control sheet 21 between an indexing fold line and the left-hand edge of the model stock column corresponding thereto be equal to the width of the stock list between the pocket forming fold line 23 on the left and the right-hand edge of the wanted column 27. When this condition is observed, the appropriate "model stock" column on the control sheet 21 will always line up immediately to the right of the "wanted" column 27 on the corresponding number stock list of the stock list sheet.

Having now described my invention in connection with a particularly illustrated embodiment thereof, it will be appreciated that variations and modifications thereof may occur to those persons normally skilled in the art without departing from the essential spirit or scope of my invention, and accordingly, it is intended to claim the same broadly as well as specifically as indicated by the appended claims.

What is claimed as new and useful is:

1. A merchandise inventory control device comprising a stock list part and a separate control sheet part each of which includes indexing means conjointly operative to index the parts to one another so that a specific data bearing portion of said control sheet is visibly disposed immediately adjacent to a specific terminating edge portion of said stock list, said stock list indexing means consisting of a pocket formed by folding a portion of said stock list part back upon itself along a defined fold line, said control sheet indexing means consisting of one edge of said control sheet which is disposable within said stock list indexing pocket with the said one edge in abutment with the pocket bottom and a plurality of parallel equi-spaced fold lines defined on said control sheet, said fold lines being also parallel to the said one edge of said control sheet disposable within the pocket of said stock list, said control sheet being selectively foldable along a desired one of said fold lines to thereby define a new edge of said control sheet for abutting disposition within the aforesaid pocket of a stock list whereby said control sheet may be indexed to a plurality of different stock lists of the same physical form as the aforesaid stock list, said control sheet being wider than said stock list in a direction measured laterally from the stock list pocket bottom so that said stock list overlies a portion of said control sheet and said control sheet extends laterally outward beyond said stock list, and when so indexed the pertinent control sheet data appears visibly thereon immediately laterally adjacent to the stock list terminating edge, and indicating means associated with each of said control sheet plurality of fold lines and said one edge and with each stock list for denoting which specific fold line of said one edge of said control sheet is to be used when it is desired to index the control sheet to a specific stock list.

2. A merchandise inventory control device comprising a stock list part and a separate control sheet part each of which includes indexing means conjointly operative to index the parts to one another so that a specific data bearing portion of said control sheet is visibly disposed immediately adjacent to a specific terminating edge portion of said stock list, said stock list indexing means comprising a pocket formed by folding a portion of said stock list part back upon itself along a defined fold line which extends parallel to the aforesaid specific terminating edge of said stock list and is spaced therefrom by a predetermined fixed distance, said control sheet indexing means comprising an edge of said control sheet disposable within said stock list indexing pocket with the said control sheet edge in abutment with the pocket bottom, and a plurality of fold lines defined on said control sheet in parallel relation to one another and to the said control sheet indexing edge, each of said plurality of fold lines and said control sheet indexing edge being equispaced from the lines immediately adjacent thereto, said control sheet being wider than said stock list and the said specific data bearing portion of said control sheet being spaced laterally from said control sheet indexing edge by a distance equal to the aforesaid predetermined fixed distance between the said stock list pocket bottom defining fold line and stock list specific terminating edge, said control sheet specific data bearing portion including a plurality of parallel data columns each of which extends parallel to a particular one of said plurality of fold lines, discrete identifying means associating particular data columns with particular fold lines, and each data column being spaced from its associated fold line by a distance equal to the aforesaid predetermined fixed distance between the said stock list pocket bottom defining fold line and stock list specific terminating edge, said control sheet being selectively foldable along a desired one of said fold lines to thereby define a new indexing edge of said control sheet for abutting disposition within the aforesaid pocket of a stock list, whereby when said stock list and control sheet are indexed as aforesaid said stock list overlies a portion of said control sheet and a specific data column of said control sheet appears visibly thereon immediately adjacent to the said stock list specific terminating edge, so that said control sheet may be indexed to a plurality of different stock lists of the same physical form as the aforesaid stock list but which different stock lists each include identifying means corresponding to one of the said discrete identifying means which associate a particular control sheet data column with a particular data sheet fold line.

3. The inventory control device according to claim 2 wherein said stock list part comprises a single sheet of material upon which is printed a plurality of individual stock lists in side-by-side relation to one another and each separated from an adjacent one by fold line pocket forming indexing means.

References Cited in the file of this patent

UNITED STATES PATENTS

| | | |
|---|---|---|
| 1,097,107 | Norton | May 19, 1914 |
| 1,885,928 | Lilly | Nov. 1, 1932 |
| 2,886,345 | Du Brul | May 12, 1959 |
| 2,931,667 | Schuessler | Apr. 5, 1960 |
| 2,955,849 | Schuessler | Oct. 11, 1960 |

FOREIGN PATENTS

| | | |
|---|---|---|
| 9,691 | Great Britain | Apr. 28, 1904 |